(12) United States Patent
Kaster et al.

(10) Patent No.: US 7,341,009 B2
(45) Date of Patent: Mar. 11, 2008

(54) SEED HOPPER

(75) Inventors: P. Philip Kaster, Shelbyville, IN (US); Craig A. Kaster, Westfield, IN (US)

(73) Assignee: Kasco Manufacturing Company, Inc., Shelbyville, IN (US)

( * ) Notice: Subject to any disclaimer, the term of this patent is extended or adjusted under 35 U.S.C. 154(b) by 430 days.

(21) Appl. No.: 10/877,652

(22) Filed: Jun. 25, 2004

(65) Prior Publication Data

US 2005/0284349 A1 Dec. 29, 2005

(51) Int. Cl.
*A01C 7/00* (2006.01)
*A01C 9/00* (2006.01)

(52) U.S. Cl. ...................................... 111/177
(58) Field of Classification Search ......... 111/170–188
See application file for complete search history.

(56) References Cited

U.S. PATENT DOCUMENTS

| 2,550,354 A | 4/1951 | Jacobsen |
| 4,030,428 A | 6/1977 | Truax |
| 4,274,751 A | 6/1981 | Rector et al. |
| 4,660,987 A | 4/1987 | Robinson |
| 4,723,849 A | 2/1988 | Boring |
| 4,749,304 A * | 6/1988 | Craig .......................... 404/101 |
| 5,035,190 A | 7/1991 | Grimes |
| 2002/0167861 A1* | 11/2002 | Barton et al. ................ 366/142 |

* cited by examiner

*Primary Examiner*—Christopher J. Novosad
(74) *Attorney, Agent, or Firm*—Woodard, Emhardt, Moriarty, McNett & Henry LLP

(57) ABSTRACT

A seed dispensing hopper having openings in which picker wheels are rotatably disposed. The picker wheels are disposed in a seed bin shaped to direct seed towards the picker wheels. Flexible elements rotate about an axis of the hopper and are aligned over the picker wheels. As the flexible elements rotate, they wipe the sides of the hopper. At the bottom of their rotation, the ends of the flexible elements and the teeth of the picker wheels are moving toward one another. The flexible elements engage the picker wheels as they traverse them, thereby creating an advantageous "spoon-feeding" action which ensures that even sticky or non-flowable seeds can be completely emptied from the hopper.

16 Claims, 8 Drawing Sheets

SEED HOPPER

FIELD OF THE INVENTION

The present invention relates generally to seed hoppers and more particularly to seed hoppers that mix seed and deposit it onto a ground surface.

BACKGROUND OF THE INVENTION

Seed can be dispensed onto land areas with a traditional seed box having seed compartments with a seed dispensing slot in each seed compartment. A picker wheel is rotatably disposed in each seed dispensing slot to keep the seed moving through the slots at a uniform rate without clogging. However, the low density, or "fluffiness," as it were, of certain types of seed can be problematic when dispensing from a traditional seed box, in that the hopper will not completely empty. For example, Warm Season Grass seed, or Prairie Grass seed, such as Big Bluestem, Little Bluestem, Indian Grass, Side Oats Gramma, or other "fluffy" or bearded seed can be problematic when dispensing from a traditional seed box. When dispensing these types of seed, the hopper empties to about one-half or one-third full, at which point the remaining seed remains in the hopper with continued operation. One solution offered by seed dispensing manufacturers is to simply keep filling the hopper as soon as about half of the seed is dispensed from it. A better solution for this frustrating problem is desired.

SUMMARY OF THE INVENTION

The present invention provides a seed dispensing hopper with an opening in which picker wheels are rotatably disposed. The seed dispensing hopper includes flexible elements that rotate about an axis of the hopper and wipe the walls of the hopper. The flexible elements are aligned over the picker wheels and engage the picker wheels as the dispenser operates. As the flexible elements engage the picker wheels, the ends of the flexible elements spoon-feed seed into the openings from which it is dispensed.

In one form thereof, the present invention provides a seed dispensing hopper with an opening in which a picker wheel is disposed. The seed dispensing hopper includes a "fluffer" or rotatable mixing bar with a flexible element extending from the mixing bar. As the mixing bar rotates, the flexible element aligns with the picker wheel.

In another form thereof, the present invention provides a seed dispensing hopper having an opening in which a picker wheel is positioned. The seed dispensing hopper includes a mixing bar that rotates within the hopper. The mixing bar has a flexible element and a rigid element extending from the mixing bar.

In a preferred form, the flexible elements wipe the hopper as the mixing bar rotates. Preferably, as the mixing bar rotates, an end of the flexible element engages a tooth or teeth of the picker wheel. Further, the end of the flexible element is traveling in a direction substantially opposite to that of the tooth as the end engages the tooth. More preferably, the picker wheel has pockets adapted to hold seed. As the mixing bar rotates, the flexible elements push seed into the pockets of the picker wheels.

In yet another form thereof, the present invention provides a seed dispensing hopper with an opening in which a rotatable picker wheel is disposed. The seed dispensing hopper includes a movable flexible element. During operation, the end of the flexible element moves toward and contacts a portion of the picker wheel.

In another form thereof, the present invention provides a novel method of dispensing seed onto a surface. In this inventive method, a picker wheel rotatably disposed in an opening of a hopper is provided. The hopper includes a movable flexible element. Seed is added to the hopper and the movable flexible element is rotated about an axis of the hopper while the picker wheel is rotated. As the flexible element and picker wheel rotate, the movable flexible element contacts a portion of the seed and pushes the portion of the seed toward the picker wheel, thereby dispensing the portion of the seed from the opening onto the surface. In a preferred form, all of the seed in the hopper is emptied onto the surface.

Advantageously, the inventive seed hopper of the present invention provides a solution for seeding with native grass or other "fluffy" seeds in which the hopper is substantially clog free and the hopper can dispense all of the seed in the hopper.

Further, the present invention prevents the picker wheels from hollowing out an empty space or hole in the fluffy seed in the hopper as the picker wheels are rotated. Advantageously, as the mixing bar rotates, the flexible elements push seed into the pockets of the picker wheels and prevent an empty space or hole from forming in the seed, thereby allowing the hopper to empty.

Another benefit of the present invention allows for varied rates of dispensing seed from the hopper. The mixing bar can be rotated faster or slower relative to the picker wheels to change the dispense rate of seed. Likewise, the picker wheels can be rotated faster or slower relative to the mixing bar to change the dispense rate of seed.

BRIEF DESCRIPTION OF THE DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein.

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The seed hopper (also referred to herein as "hopper") in accordance with the illustrated embodiment has openings in which picker wheels are rotatably disposed. Flexible elements rotate about an axis of the hopper and are aligned with the picker wheels. As the flexible elements rotate, they wipe the sides of the hopper to remove any seed stuck to the sides of the hopper. At the bottom of the flexible elements' rotation, the ends of the flexible elements engage and traverse teeth of the picker wheels. As the ends of the flexible elements engage the teeth, the ends and the teeth are moving toward one another, thereby creating an advantageous "spoon-feeding" action, which ensures that even sticky or non-flowable seed can be completely emptied from the hopper.

Figure 1:
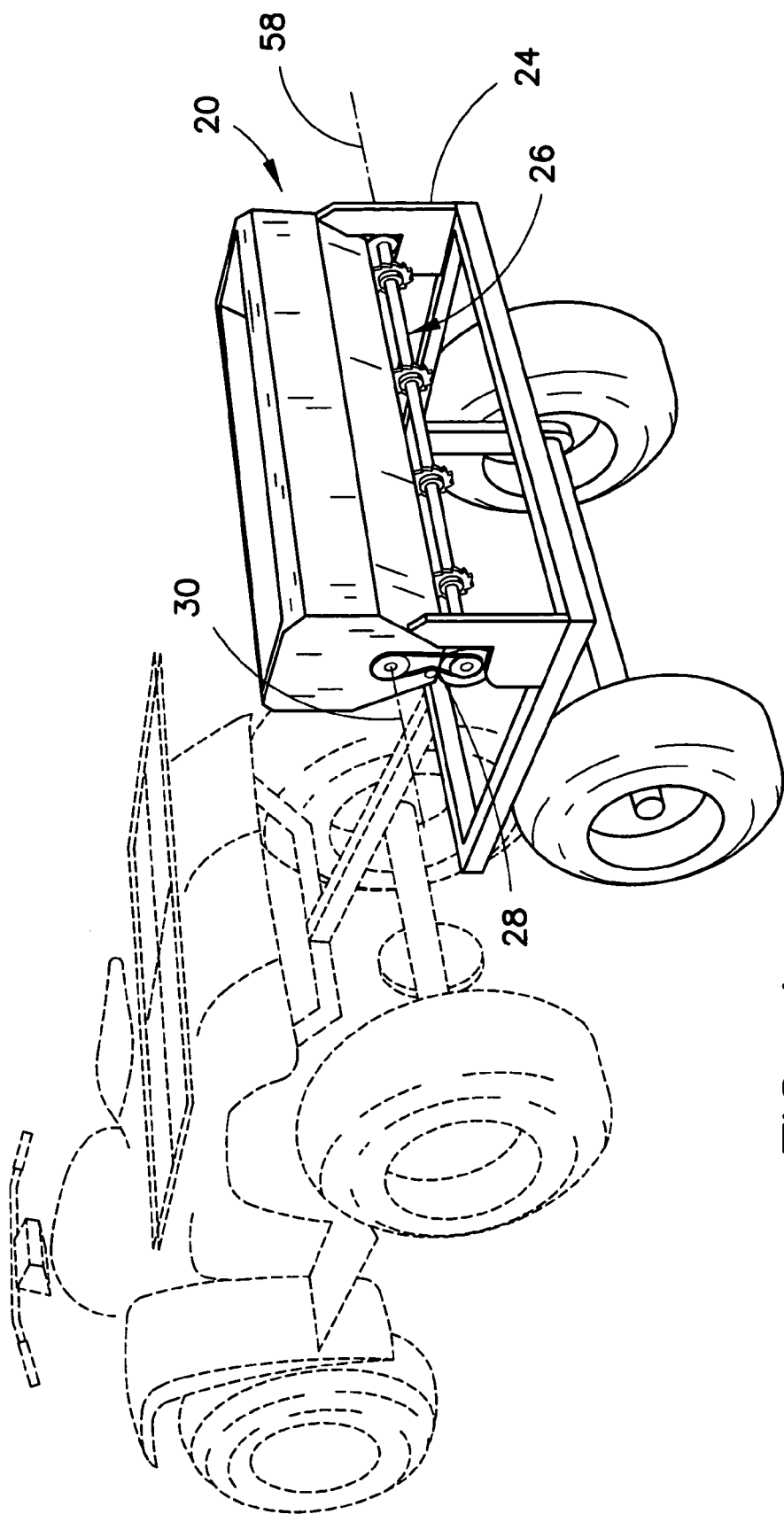
FIG. 1 is a perspective view of a seed hopper in accordance with one embodiment of the present invention, illustrated with an all terrain vehicle ("ATV") in phantom pulling the seed hopper.
Figure 2:
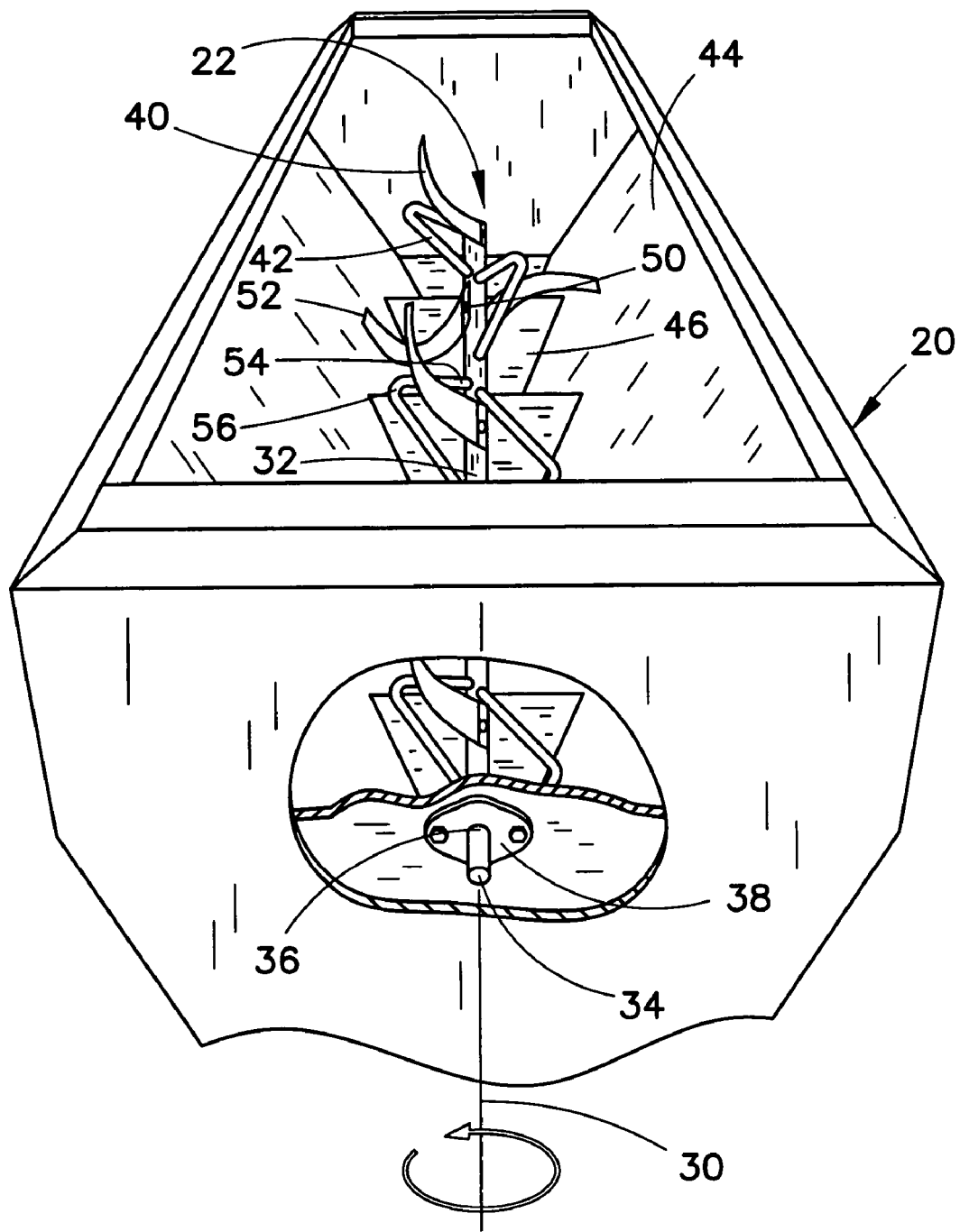
FIG. 2 is an enlarged fragmentary perspective view with portions broken away illustrating the mixing beam assembly of the seed hopper shown in FIG. 1.

Turning to FIGS. 1 and 2, hopper 20 includes a mixing beam assembly 22 mounted to a frame 24. Mounted to hopper 20 is a picker wheel assembly 26. A drive mechanism 28, which rotates mixing beam assembly 22 and picker wheel assembly 26 in the same direction, is mounted to hopper 20. It should be appreciated that drive mechanism 28 can be configured to rotate the mixing beam assembly 22 and the picker wheel assembly 26 in opposite directions. Further, the drive mechanism 28 can be configured to rotate the mixing beam assembly 22 and the picker wheel assembly 26 at different rates of speed relative to each other.

Figure 3:
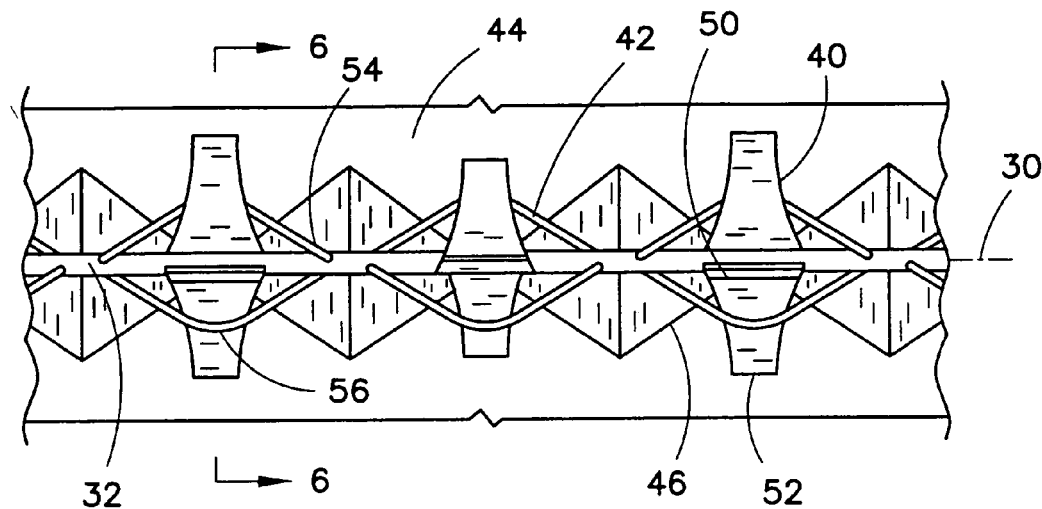
FIG. 3 is a top fragmentary view of the mixing beam assembly of the seed hopper shown in FIG. 2.

Referring to FIGS. 2 and 3, the mixing beam assembly 22 is suspended in the hopper 20 and is rotatable about beam axis 30. Mixing beam assembly 22 has a mixing bar 32 disposed along beam axis 30. Mixing bar 32 has a journal end 34 that is rotatably disposed in bearing 36 formed in plate 38 and is thus suspended in hopper 20. Mixing bar 32 in the illustrated embodiment is a unitary, elongated, cylindrical member having a plurality of flexible elements 40 and a plurality of paddles 42 extending from it. It should be appreciated that mixing bar 32 can be shaped or formed differently in other embodiments. By way of non-limiting example, the mixing bar 32 can be rectangular, polygonal, or elliptical, to name a few. The mixing bar 32 can be formed from materials such as metal, plastic, or wood, to name a few. Further, the mixing bar 32 can be unitary or assembled from a plurality of segments. It should also be understood that other means of rotatably connecting mixing bar 32 to hopper 20, for example, a universal joint, could be used.

Flexible elements 40 can be affixed to mixing bar 32 by welding, fastening, gluing, or any number of suitable attachment means. Flexible elements 40 can be formed from plastic, rubber, metal, or any other material whose flexibility is consistent with the mixing, wiping, and traversing function described in more detail below. Preferably, flexible elements 40 are formed from polyester reinforced plastic vinyl-coated belting. Paddles 42 can be integrally formed with mixing bar 32 or they can be affixed thereto by welding, fastening, or any number of suitable attachment means. Paddles 42 are made from the same or similar material as mixing bar 32.

Figure 4:
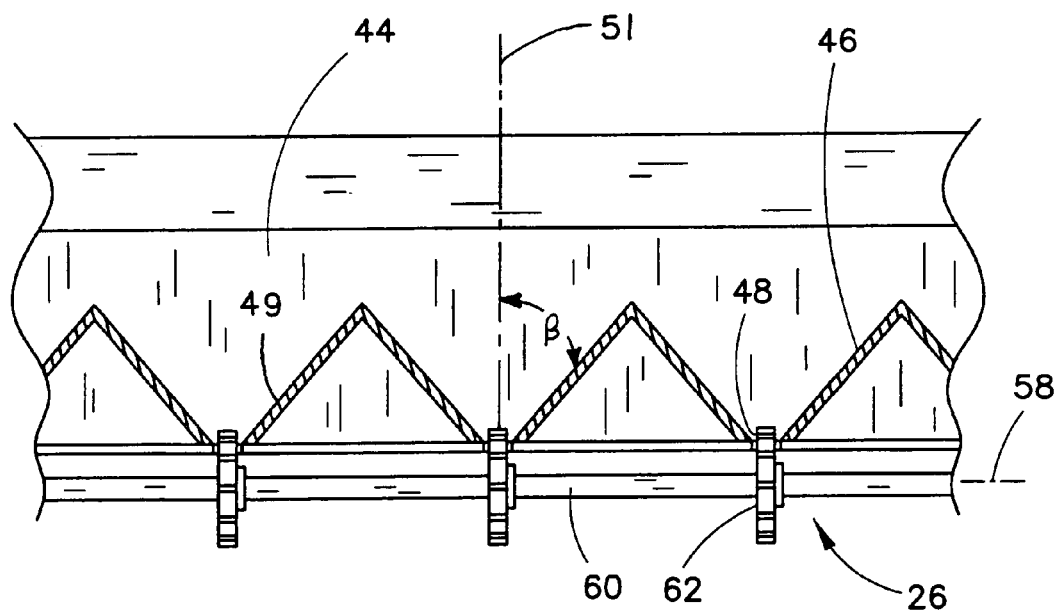
FIG. 4 is a side fragmentary view in partial cross-section of the picker wheel assembly of the seed hopper shown in FIG. 3.

As shown in FIG. 2, hopper 20 has walls 44 and seed bins 46 disposed between the walls 44. Each seed bin 46 has bin walls 49 that form an opening 48 as shown in FIG. 4. The bin walls 49 are angled or slanted relative to a vertical axis 51 as shown in FIG. 4. The vertical axis 51 is perpendicular to the picker wheel axis 58 described below. Further, the bin walls 49 form an angle β with the vertical axis 51. In preferred embodiments, the angle β is between 30 and 60 degrees. The bin walls 49 are steep to facilitate the seed moving downward toward the picker wheel assembly 26. Preferably, the flexible elements 40 and the paddles 42 are affixed to the mixing bar 32 such that the flexible elements 40 and the paddles 42 are positioned centrally with respect to a corresponding seed bin 46. In the illustrated embodiment, two flexible elements 40 and two paddles 42 are each disposed over one seed bin 46, however, in other embodiments, any number of flexible elements 40 and paddles 42 can be disposed in or over a single seed bin 46.

As shown in FIG. 3, flexible elements 40 have a first portion 50 attached to the mixing bar 32 and a second portion 52 extending towards the walls 44. As mixing beam assembly 22 rotates, the second portion 52 of the flexible element 40 wipes the walls 44. In the illustrated embodiment, the flexible element 40 is trapezoidal with curved sides, but it should be appreciated that the flexible element 40 can be other shapes such as, circular, triangular, or any other shape that allows the second portion 52 to wipe the walls 44. Further, the second portion 52 is flat in cross section to wipe the walls 44, and traverse the picker wheel assembly 26, which is described in more detail below.

Paddles 42 have a first portion 54 attached to mixing bar 32 and a second portion 56 extending away from mixing bar 32. In the illustrated embodiment, the paddles 42 are of a semi-circular shape, but it should be appreciated that in other embodiments the shape of the paddles 42 can be rectangular or triangular, to name a few.

Figure 5:
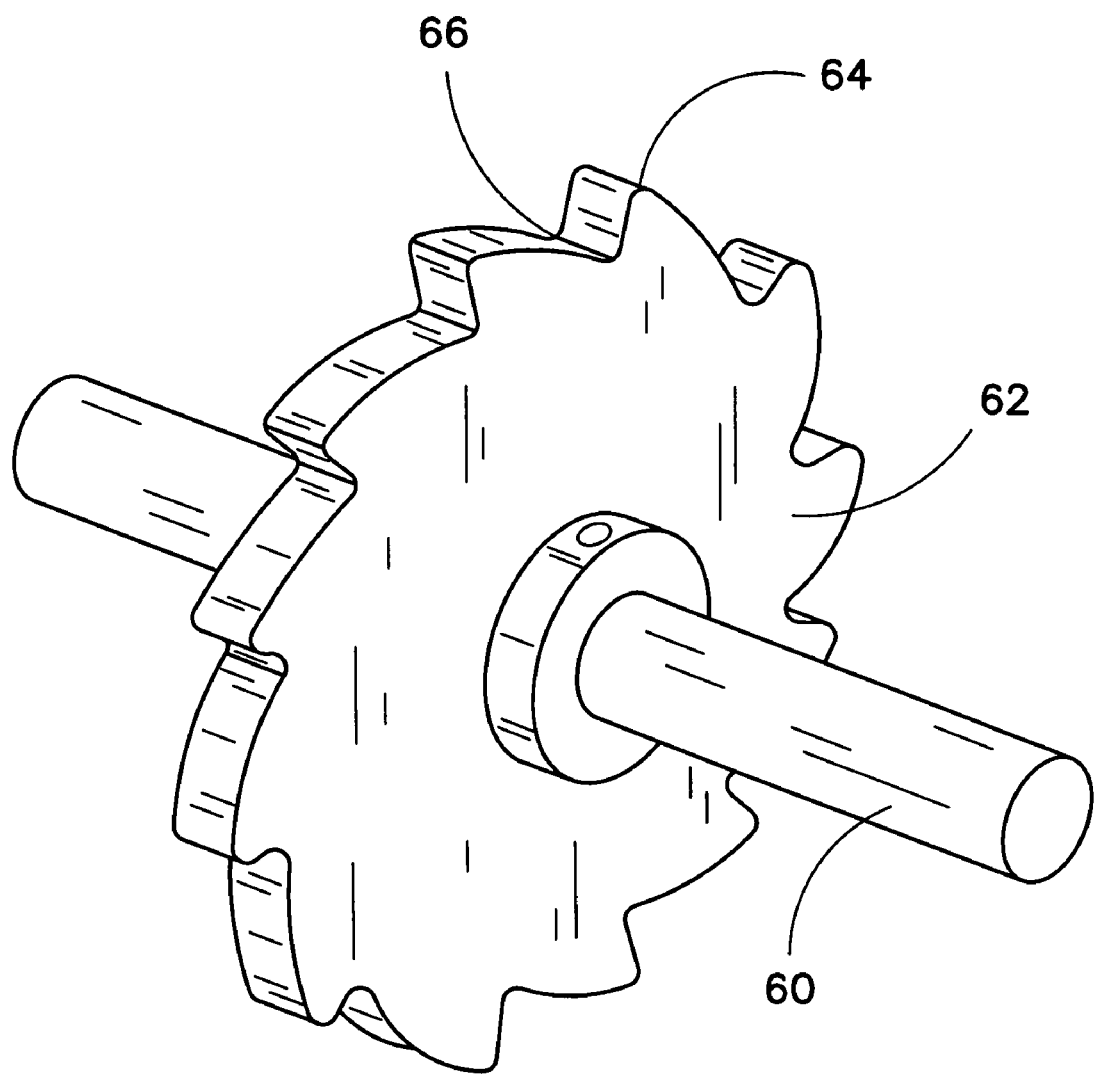
FIG. 5 is an enlarged perspective view of a picker wheel of the picker wheel assembly.

Referring to FIG. 1, the picker wheel assembly 26 is suspended in the hopper 20 and is rotatable about picker wheel axis 58. As shown in FIG. 4, the picker wheel assembly 26 has a picker bar 60 with a plurality of picker wheels 62 attached thereto. As shown in FIG. 6, the picker wheel assembly 26 is supported by the hopper 20 such that each of the picker wheels 62 is disposed in one of the openings 48. However, the picker wheel assembly 26 can be supported by the hopper 20 such that two or more picker wheels 62 are disposed in each opening 48. As shown in more detail in FIG. 5, the picker wheel 62 has a plurality of teeth 64 with pockets 66 between them. In the illustrated embodiment, the teeth 64 and pockets 66 form a smooth saw-tooth configuration, but it should be appreciated that the configuration of the teeth 64 and pockets 66 between them may be varied depending upon the type and property of the particular seed being dispensed and other design criteria. Generally, teeth 64 and pockets 66 should be configured to capture and move seed, as described in more detail below. Picker wheel 62 can be formed from plastic, metal, wood, or any other material that can be shaped to form teeth 64 and pockets 66.

In the embodiment illustrated in FIGS. 3 and 4, the flexible element 40 is aligned with the picker wheel 62 as the mixing bar 32 rotates. The paddles 42 are positioned on the mixing bar 32 in an alternating relationship with the flexible elements 40. It should be appreciated that other arrangements of paddles 42 and flexible elements 40 can be employed from hopper 20.

In operation, seed is added to the hopper 20 such that the seed bins 46 are at least partially filled. The drive mechanism 28 drives the mixing beam assembly 22 and the picker wheel assembly 26 such that the mixing beam assembly 22 and the picker wheel assembly 26 rotate in the same direction. While the mixing beam assembly 22 is rotated, the mixing bar 32, the flexible elements 40, and the paddles 42 are also rotated. Similarly, while the picker wheel assembly 26 is rotated, the picker bar 60 and the picker wheels 62 are rotated.

Figure 6A:
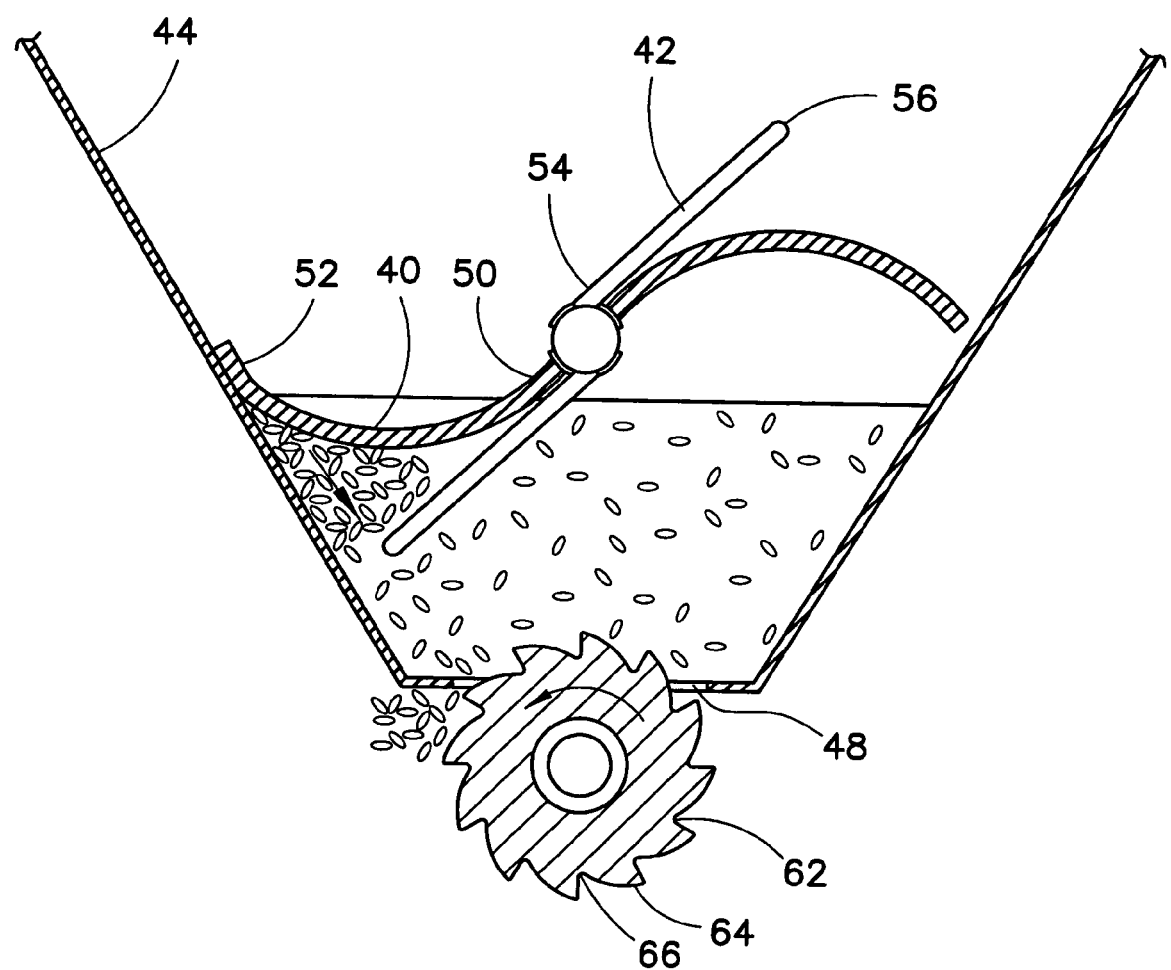
FIG. 6A is a side fragmentary view taken along lines 6-6 of FIG. 3 of the mixing beam assembly and picker wheel assembly of the seed hopper of FIG. 1.

As shown in FIG. 6A, as the mixing bar rotates counterclockwise, the flexible element 40 shown on the left side of the hopper 20 moves toward the picker wheel 62. In so doing, the second portion 52 wipes hopper wall 44 and thereby prevents seed from sticking thereto. Flexible element 40 is bent in an arc as shown and second portion 52 is thus biased against wall 44, which promotes an effective wiping action as mixing bar 32 rotates.

Figure 6B:
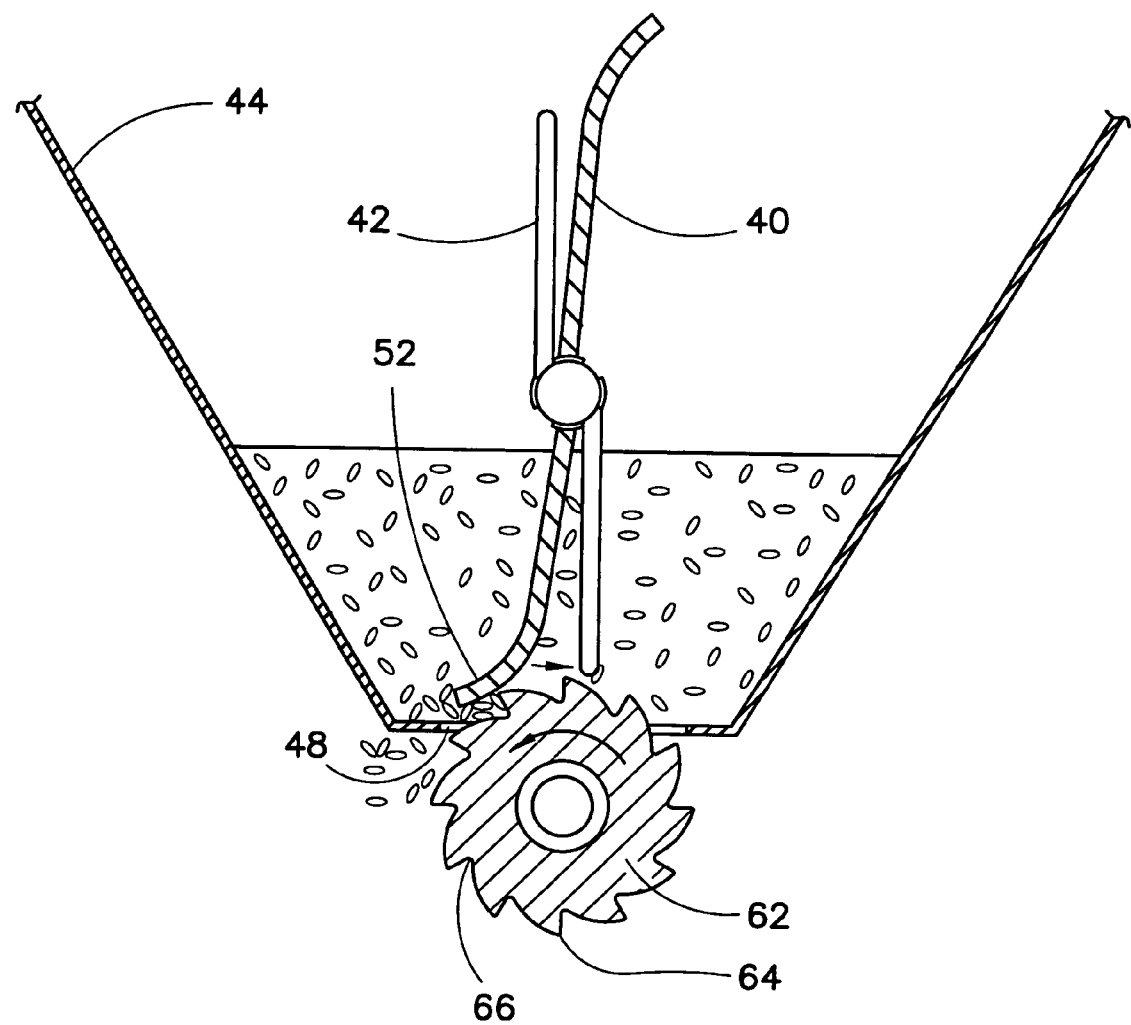
FIG. 6B is a side fragmentary view taken along lines 6-6 of FIG. 3 of the mixing beam assembly and picker wheel assembly of the seed hopper of FIG. 1 after the mixing beam assembly and picker wheel assembly are rotated approximately 90°.

In FIG. 6B, the mixing bar 32 is shown rotated through approximately another 90° from its position depicted in FIG. 6A. At this point, second portion 52 of the flexible element 40 is moving in a direction substantially opposite that of the teeth 64 of picker wheel 62. In other words, second portion 52 and the teeth 64 of the picker wheel 62 are moving toward one another. Advantageously, this movement creates a "spoon-feeding" action in which second portion 52 scoops seed and pushes it into pockets 66 as the flexible element 40 traverses the picker wheel 62. The scooping action and positive engagement of the flexible elements 40 with the picker wheels 62 is believed to promote the complete emptying of the hopper 20 even when non-flowable, sticky seed is being dispensed. Further, as each picker wheel 62 rotates in the opening 48, gravity allows the seed to drop from the pocket 66 and thus be dispensed onto the ground surface.

Figure 6C:
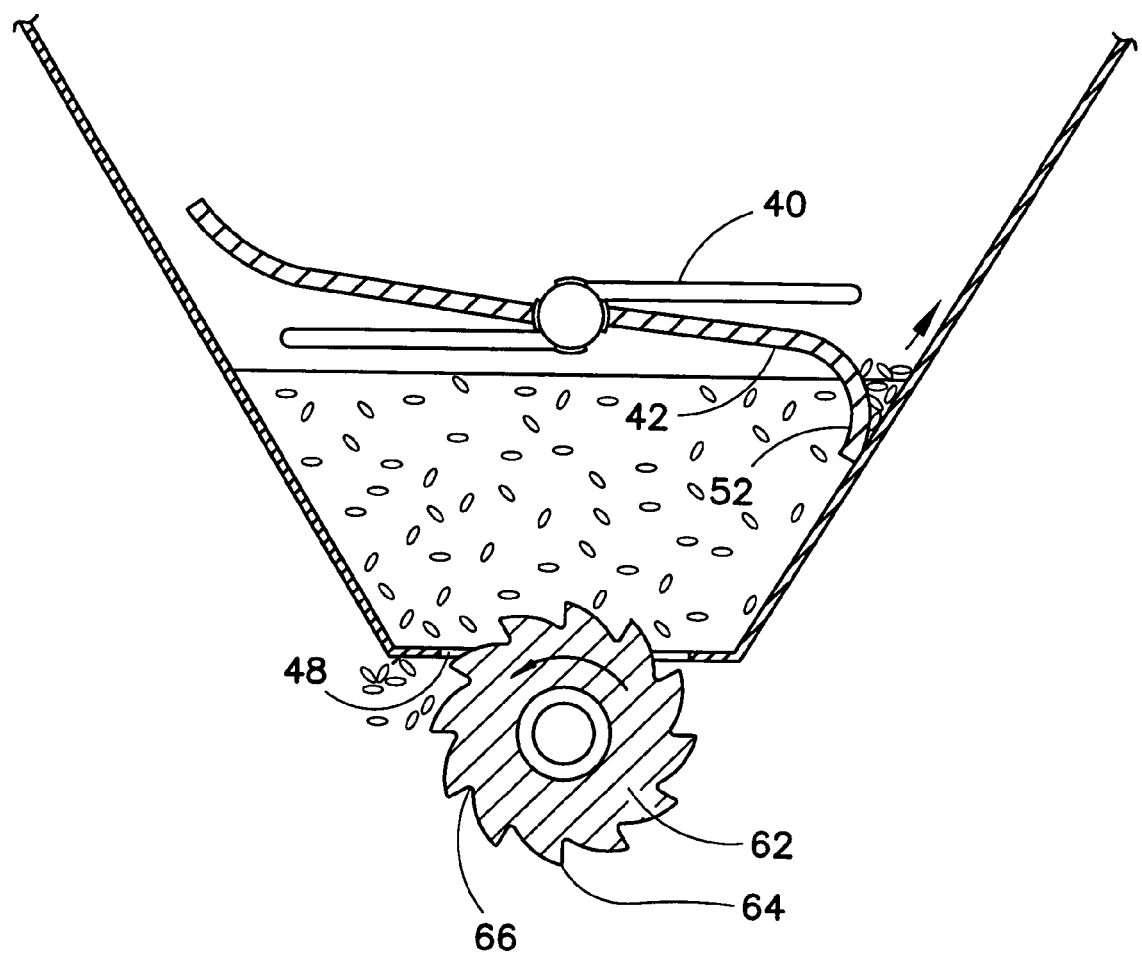
FIG. 6C is a side fragmentary view taken along lines 6-6 of FIG. 3 of the mixing beam assembly and picker wheel assembly of the seed hopper of FIG. 1 after the mixing beam assembly and picker wheel assembly are rotated approximately 180°.

Turning now to FIG. 6C, the mixing bar 32 has rotated through approximately another 90° from its position depicted in FIG. 6B. At this point second portion 52 of the flexible element 40 discussed with reference to FIGS. 6A and 6B has now moved beyond the picker wheel 62 and is wiping the hopper wall 44 on the right side of FIG. 6C as shown. Since second portion 52 of the flexible element 40 is now moving away from the picker wheel 62, the movement of flexible element 40 during this portion of its rotation functions mainly to wipe the hopper wall 44 and agitate the seed in the hopper 20.

As shown in FIGS. 6A-6C, the paddles 42 mix the seed in the seed bins 46 as the mixing bar 32 rotates about the beam axis 30. Advantageously, the seed can be completely dispensed from the hopper 20.

Figure 7:
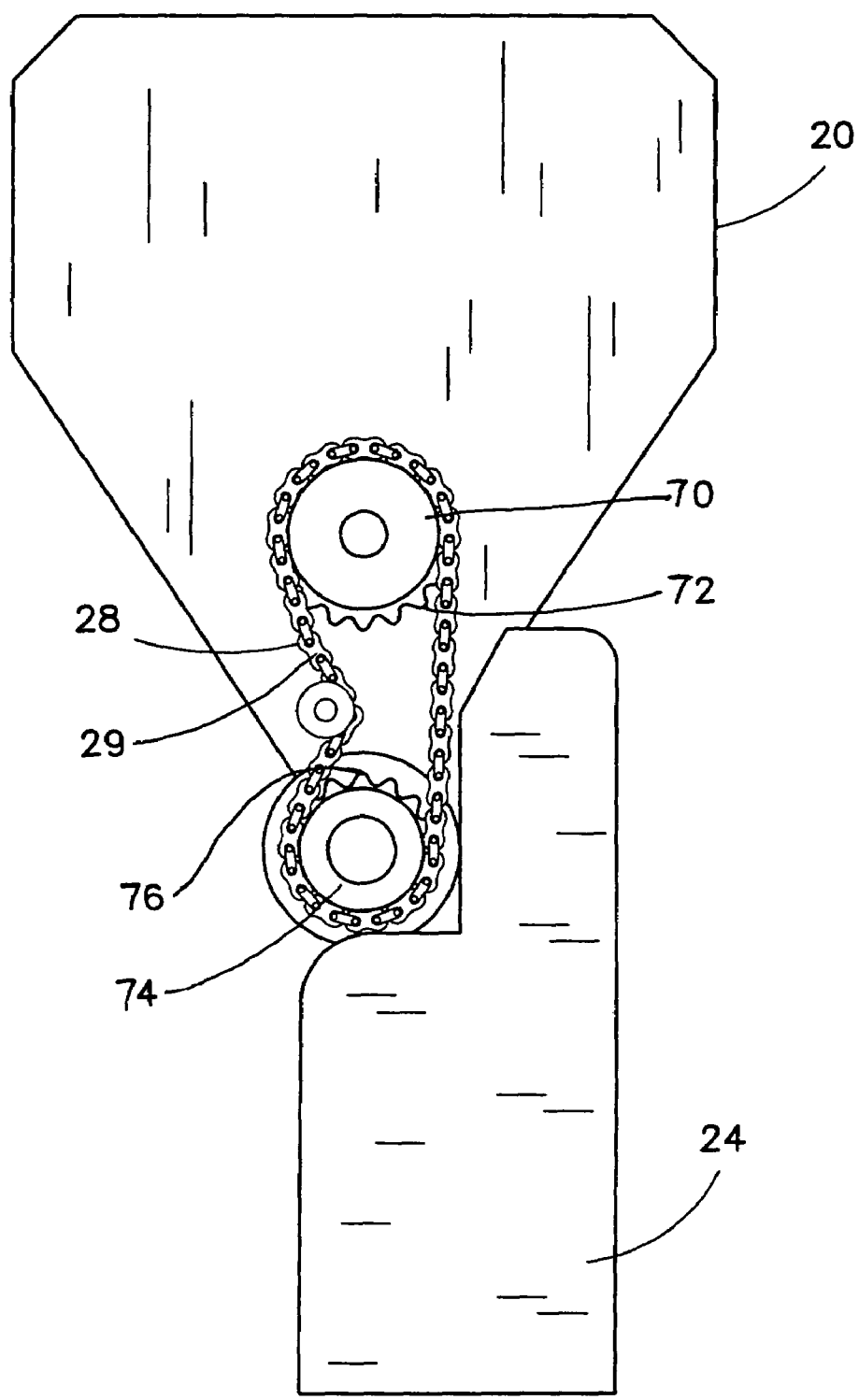
FIG. 7 is a side view of a drive mechanism of the seed hopper illustrated in FIG. 1 for rotating the mixing beam assembly and the picker wheel assembly.

In the embodiment illustrated in FIG. 7, a mixing sprocket 70 with teeth 72 connects to the mixing beam assembly 22 (shown in FIG. 2). The mixing sprocket 70 attaches to the plate 38, described above, such that the sprocket 70 rotates the mixing beam assembly 22. A picker sprocket 74 with teeth 76 connects to the picker wheel assembly 26 (shown in FIG. 4) and rotates the picker wheel assembly 26. Sprocket 70 and sprocket 72 can be formed from plastic, metal, wood, or any other material that can be adapted to be driven by drive mechanism 28. A continuous drive mechanism 28 in the form of a drive chain 29 is connected to the mixing sprocket 70 and the picker sprocket 74 to rotate mixing sprocket 70 and picker sprocket 74 in the same direction. In other embodiments, a first drive chain (not shown) can be connected to sprocket 70 and a second drive chain (not shown) can be connected to sprocket 74. The separate drive chains connected to sprocket 70 and sprocket 74 allow them to be rotated at different speeds relative to each other.

Mixing sprocket 70 and picker sprocket 74 are substantially the same size but it should be appreciated that sprocket 70 and sprocket 74 can be different sizes. Different sizes of sprockets can vary the speed the mixing beam assembly 22 and picker wheel assembly 26 each rotate. By way of non-limiting example, teeth 72 can be larger than teeth 76 such that sprocket 74 and picker wheel assembly 26 rotate faster than sprocket 70 and mixing beam assembly 22 with a continuous drive chain 29. Conversely in another embodiment, teeth 76 can be larger than teeth 72 such that sprocket 70 and mixing beam assembly 22 rotate faster than sprocket 74 and picker wheel assembly 26 with a continuous drive chain 29.

While a preferred embodiment incorporating the principles of the present invention has been disclosed hereinabove, the present invention is not limited to the disclosed embodiments. Instead, as noted above, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seed dispensing apparatus, comprising:
   a hopper defining an opening in which is disposed a picker wheel;
   a mixing bar rotatably disposed in the hopper;
   a flexible element extending from the mixing bar; and
   wherein the flexible element engages the picker wheel and pushes seed into the picker wheel as the mixing bar rotates.

2. The apparatus of claim 1, wherein the picker wheel comprises teeth and defines pockets, the teeth alternatingly arranged with the pockets, and the flexible element engages the teeth and pushes seed into the pockets as the mixing bar rotates.

3. The apparatus of claim 2, wherein the flexible element travels in a direction substantially opposite to that of the teeth as the flexible element engages the teeth.

4. The apparatus of claim 1, wherein the flexible element wipes the hopper as the mixing bar rotates.

5. The apparatus of claim 1, wherein the flexible element is formed from rubber.

6. The apparatus of claim 1, wherein the flexible element is adapted to push seed into pockets defined by the picker wheel.

7. The apparatus of claim 1, further comprising a paddle extending from the mixing bar, the paddle configured to mix seed as the mixing bar rotates.

8. The apparatus of claim 7, wherein the paddle comprises a semicircular shape.

9. The apparatus of claim 7, wherein the paddle and the flexible element are disposed in an alternating relationship about the mixing bar.

10. The apparatus of claim 1, wherein the flexible element traverses the picker wheel.

11. The apparatus of claim 1, further comprising a seed bin disposed in the hopper.

12. The apparatus of claim 11, wherein the hopper comprises a vertical axis and the seed bin comprises bin walls angled relative to the vertical axis.

13. The apparatus of claim 12, wherein the bin walls and the vertical axis form an angle of between about 30 and 60 degrees.

14. The apparatus of claim 1, wherein the picker wheel rotates at a first speed and the mixing bar rotates at a second speed.

15. The apparatus of claim 14, wherein the first speed is about the same as the second speed.

16. The apparatus of claim 14, wherein the first speed and the second speed are different.

* * * * *